United States Patent
Hu

(10) Patent No.: US 10,586,080 B2
(45) Date of Patent: Mar. 10, 2020

(54) METHOD AND APPARATUS FOR UPDATING MINING MODEL

(71) Applicant: BAIDU ONLINE NETWORK TECHNOLOGY (BEIJING) CO., LTD., Beijing (CN)

(72) Inventor: Zejin Hu, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 149 days.

(21) Appl. No.: 15/914,098

(22) Filed: Mar. 7, 2018

(65) Prior Publication Data

US 2018/0285346 A1 Oct. 4, 2018

(30) Foreign Application Priority Data

Mar. 31, 2017 (CN) .......................... 2017 1 0210161

(51) Int. Cl.
| | |
|---|---|
| *G06F 40/30* | (2020.01) |
| *G06N 20/00* | (2019.01) |
| *G06F 16/36* | (2019.01) |
| *G06F 16/33* | (2019.01) |
| *G06N 5/02* | (2006.01) |

(52) U.S. Cl.
CPC .......... *G06F 40/30* (2020.01); *G06F 16/3344* (2019.01); *G06F 16/36* (2019.01); *G06N 5/027* (2013.01); *G06N 20/00* (2019.01)

(58) Field of Classification Search
CPC ................................................. G06F 17/2785
USPC ............................................................ 704/9
See application file for complete search history.

(56) References Cited

U.S. PATENT DOCUMENTS

| | | | |
|---|---|---|---|
| 9,990,176 B1* | 6/2018 | Gray ....................... G06F 3/167 |
| 10,089,983 B1* | 10/2018 | Gella ...................... G10L 15/22 |
| 10,102,855 B1* | 10/2018 | Sindhwani ............. G10L 15/22 |
| 10,229,680 B1* | 3/2019 | Gillespie ................ G10L 15/22 |
| 10,235,358 B2* | 3/2019 | Tur ..................... G06F 17/2785 |
| 2011/0212717 A1* | 9/2011 | Rhoads ............. G06K 9/00664 |
| | | | 455/420 |
| 2017/0270921 A1* | 9/2017 | Arslan ................. G06F 17/279 |
| 2018/0199123 A1* | 7/2018 | Rao ....................... G06F 1/1656 |

* cited by examiner

*Primary Examiner* — Jekieda R Jackson
(74) *Attorney, Agent, or Firm* — Hodgson Russ LLP

(57) ABSTRACT

The present disclosure provides a method and an apparatus for updating a mining model, which are applied to the mining model in a semantic analysis system. The method includes: acquiring a semantic analysis result obtained by analyzing a query through the semantic analysis system; generating a training format corpus according to the semantic analysis result, in which the training format corpus includes a first format corpus and a second format corpus; and performing an iterative updating on the mining model based on the first format corpus and the second format corpus, in which the first format corpus is configured to label a semantic feature in the query, and the second format corpus is configured to label a template feature in the query. With the present disclosure, a semantic analysis effect of the semantic analysis system may be improved effectively.

17 Claims, 3 Drawing Sheets

METHOD AND APPARATUS FOR UPDATING MINING MODEL

CROSS-REFERENCE TO RELATED APPLICATIONS

This application is based on and claims priority to Chinese Patent Application No. 201710210161.7, filed on Mar. 31, 2017, the entire contents of which are incorporated herein by reference.

FIELD

The present disclosure relates to a field of natural language processing technology, and more particularly to a method and an apparatus for updating a mining model.

BACKGROUND

With the development of natural language processing technology, in related arts, online data are manually analyzed to obtain semantic resources and statistics are performed manually on the semantic resources, so as to establish a mining model in a semantic analysis system.

In this case, a semantic analysis effect of the semantic analysis system is poor.

SUMMARY

Embodiments of the present disclosure provide a method for updating a mining model. The method is applied to the mining model in a semantic analysis system and includes: acquiring a semantic analysis result obtained by analyzing a query through the semantic analysis system; generating a training format corpus according to the semantic analysis result, in which the training format corpus includes a first format corpus and a second format corpus; and performing an iterative updating on the mining model based on the first format corpus and the second format corpus, in which the first format corpus is configured to label a semantic feature in the query, and the second format corpus is configured to label a template feature in the query.

Embodiments of the present disclosure provide a device for updating a mining model. The device includes: a processor, a memory for storing programs executable by the processor, in which the processor is configured to: acquire a semantic analysis result obtained by analyzing a query through the semantic analysis system; generate a training format corpus according to the semantic analysis result, in which the training format corpus includes a first format corpus and a second format corpus; and perform an iterative updating on the mining model based on the first format corpus and the second format corpus, in which the first format corpus is configured to label a semantic feature in the query, and the second format corpus is configured to label a template feature in the query.

Embodiments of the present disclosure provide a non-transitory computer-readable storage medium, and when instructions stored in the non-transitory computer-readable storage medium are executed by a processor of an apparatus, the apparatus may be configured to execute a method for updating a mining model, in which the method includes: acquiring a semantic analysis result obtained by analyzing a query through the semantic analysis system; generating a training format corpus according to the semantic analysis result, in which the training format corpus includes a first format corpus and a second format corpus; and performing an iterative updating on the mining model based on the first format corpus and the second format corpus, in which the first format corpus is configured to label a semantic feature in the query, and the second format corpus is configured to label a template feature in the query.

Additional aspects and advantages of embodiments of the present disclosure will be given in part in the following descriptions, become apparent in part from the following descriptions, or be learned from the practice of the embodiments of the present disclosure.

BRIEF DESCRIPTION OF THE DRAWINGS

Above and/or additional aspects and advantages of embodiments of the present disclosure will become apparent and more readily appreciated from the following descriptions made with reference to the drawings, in which.

DETAILED DESCRIPTION

Figure 1:
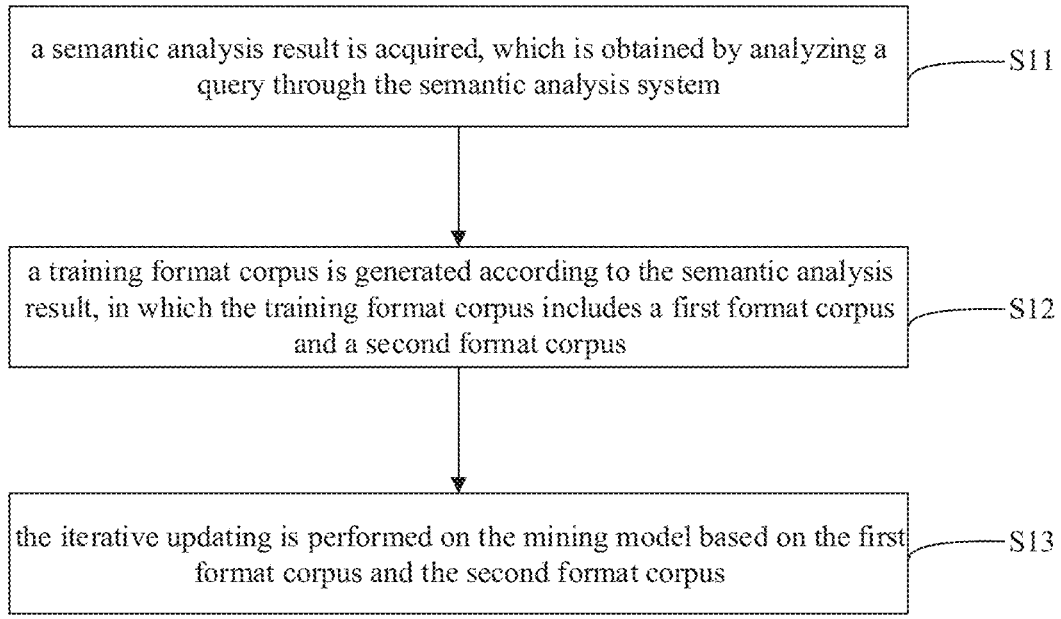
FIG. 1 is a flow chart of a method for updating a mining model according to an embodiment of the present disclosure.

Reference will be made in detail to embodiments of the present disclosure, where the same or similar elements and the elements having same or similar functions are denoted by like reference numerals throughout the descriptions. The following embodiments described herein with reference to drawings are explanatory and used to explain the present disclosure. Instead, the embodiments of the present disclosure include all the variants, modifications and their equivalents within the spirit and scope of the present disclosure as defined by the claims.

FIG. 1 is a flow chart of a method for updating a mining model according to an embodiment of the present disclosure.

The method for updating the mining model in this embodiment may be configured in an apparatus for updating the mining model. The apparatus may be configured in a server or an electronic device, which is not limited by embodiments of the present disclosure.

For example, the electronic device may be a PC (Personal Computer), a cloud device or a mobile device such as a smart phone or a tablet.

It should be noted that, as hardware, an executive body of the embodiments of the present disclosure may be, for example, a CPU (Central Processing Unit) in the server/electronic device, and as software, the executive body of the embodiments of the present disclosure may be, for example, programs in the server/electronic device, which is limited herein.

The method may be applied to a process for automatically updating the mining model in a semantic analysis system.

Referring to FIG. 1, the method for updating the mining model includes the following acts.

In act S11, a semantic analysis result is acquired, which is obtained by analyzing a query through the semantic analysis system.

In this embodiment, the user may input the query in a search box of a search engine. After the query is input by the user, the query may be transferred to a background system by the search engine. In detail, the background system may be a server of the search engine. After the server of the search engine receives the query, a semantic analysis may be performed on the query based on the semantic analysis system on cloud-sever side. In detail, a mining may be performed by the mining model in the semantic analysis system to acquire semantic resources so as to analyze the query. After the query is analyzed and the semantic analysis result is recognized, search-related operations may be triggered.

The mining model in the semantic analysis system may be pre-established specifically in a statistic manner. For example, statistics of searching behaviors of the users may be performed by background technologists and the semantic analysis results of the queries which are searched for more times may be stored in the mining model.

For example, the query input by the user is "帮我查一下今天北京 天气怎么样好不好 (Please help me to search that how about the weather in Beijing today, good or not)".

The semantic analysis may be performed on the query using the semantic analysis system and the acquired semantic analysis result may be: {field: weather; intention: search; slot: {time: today; location: Beijing}}.

In related arts, when the mining model in the semantic analysis system is established, online data are manually analyzed to obtain semantic resources and statistics are performed on the semantic resources manually.

While in the embodiments of the present disclosure, the semantic analysis result may be acquired by analyzing the query input by the user, meanwhile, the semantic resources in the semantic analysis result may be extracted automatically. At the same time of providing the user a searching service, an iterative updating may be performed on the mining model, so as to optimize automatically the mining model in the semantic analysis system and improve the semantic analysis effect of the semantic analysis system effectively.

In act S12, a training format corpus is generated according to the semantic analysis result, in which the training format corpus includes a first format corpus and a second format corpus.

In this embodiment, the first format corpus is configured to label a semantic feature in the query, and the second format corpus is configured to label a template feature in the query.

Alternatively; the first format corpus may include: first semantic contents corresponding to a field tag and an intention tag in the query respectively, a plurality of slot templates, and second semantic contents corresponding to the plurality of slot templates respectively.

Alternatively, the second format corpus may include: a plurality of combinations of at least two slot templates, and third semantic contents corresponding to the plurality of combinations respectively.

For example, regarding to the query "帮我查一下今天北京 天气怎么样好不好" input by the user, the corresponding semantic analysis result is: {field: weather; intention: search; slot: {time: today; location: Beijing}}, and the corresponding training format corpus is: 帮我查一下 (please help me to search that) 【今天 (today)/time】【北京 (Beijing)/location】【天气 (weather)】【怎么样 (how about)】好不好 (good or not); 【time】【location】【weather_slot_0】【weather_slot_1】.

The first format corpus may be "帮我查一下【今天/time】【北京/locationir】【天气】【怎么样】好不好" in the above example.

For example, the first semantic contents may be "帮我查一下", "好不好".

For example, the plurality of slot templates, and the second semantic contents corresponding to the plurality of slot templates respectively may be 【今天/time】【北京/location】【天气】【怎么样】, in which the second semantic contents may be: a semantic content "今天" corresponding to the slot template【time】, a semantic content "北京" corresponding to the slot template【location】; a semantic content "天气" corresponding to the slot template【weather_slot_0】, and a semantic content "怎么样" corresponding to the slot template【weather_slot_1】.

The second format corpus may be a plurality of combinations of the above four templates 【time】【location】【weather_slot_0】【weather_slot_1】.

Figure 2:
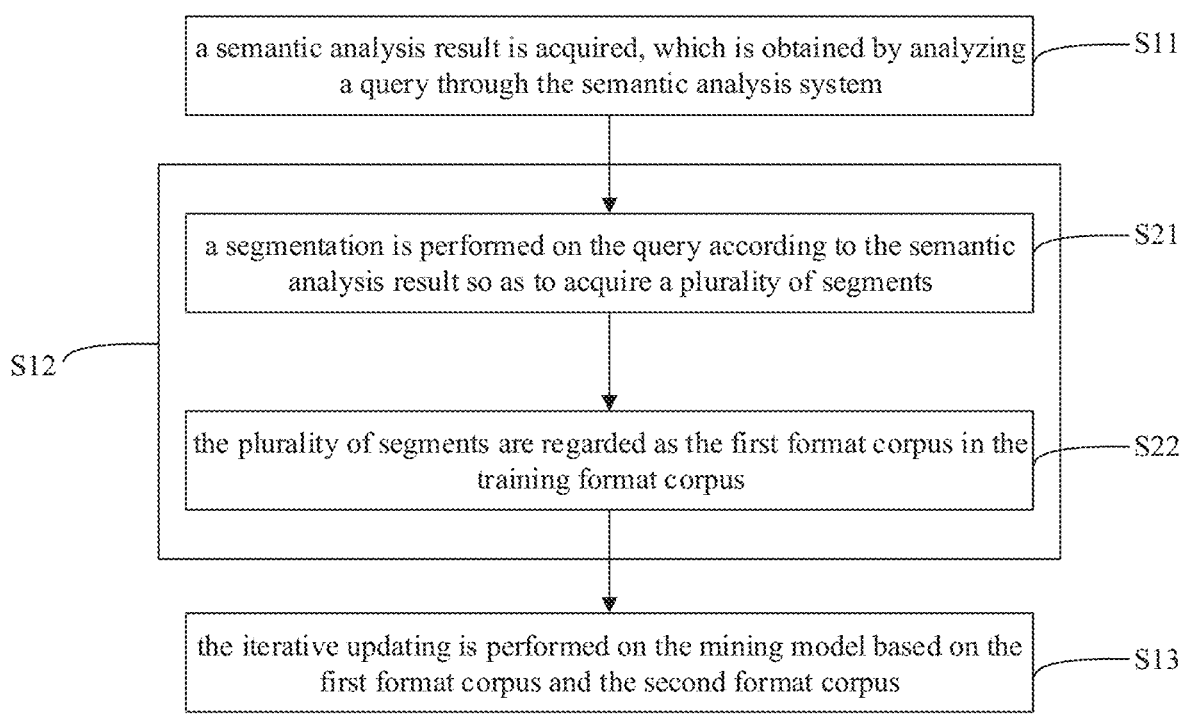
FIG. 2 is a flow chart of a method for updating a mining model according to another embodiment of the present disclosure.

Further, alternatively, referring to FIG. 2, FIG. 2 is a flow chart of a method for updating a mining model according to another embodiment of the present disclosure, in which the act S12 may include following acts.

In act S21, a segmentation is performed on the query according to the semantic analysis result so as to acquire a plurality of segments.

In act S22, the plurality of segments are regarded as the first format corpus in the training format corpus.

For example, referring to the above embodiment, the segmentation may be performed on the query "帮我查一下今 天北京天气怎 么样好不好" based on the semantic analysis result {field: weather; intention: search; slot: {time: today; location: Beijing}}; by using segmentation methods in the related arts. In this segmentation process, the plurality of segments "帮我查一下【今天/time】【北京/location】【天气】【怎 么样】好不好" may be acquired based on a word order of the query.

Thus, in the embodiments of the present disclosure, the plurality of segments "帮我查一下 【今天/time】【北京/location】【天气】【怎么样】好不好" may be regarded as the first format corpus in the training format corpus.

In the embodiments of the present disclosure, the segmentation may be performed on the query according to the semantic analysis result so as to acquire the plurality of segments, and the plurality of segments may be regarded as the first format corpus in the training format corpus, such that the iterative updating may be performed on the mining model based on the first format corpus. Since the iterative updating is performed on the mining model according to the plurality of segments acquired by performing the segmentation on the query input by the user, semantic resources for iteratively updating may be diversified and the semantic content of the mining model may be enriched, and thus the semantic effect of the semantic analysis system may be improve effectively.

Figure 3:
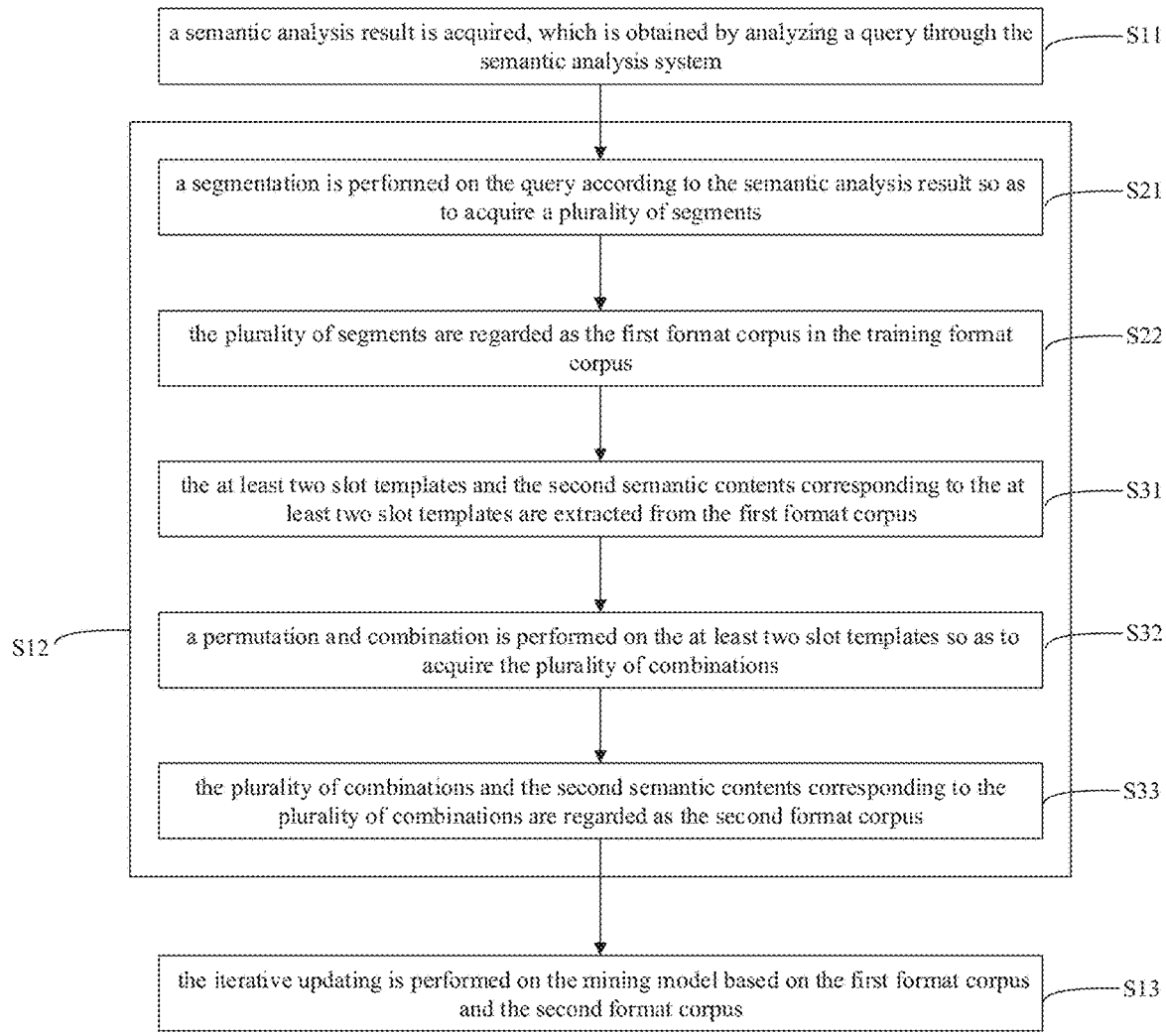
FIG. 3 is a flow chart of a method for updating a mining model according to another embodiment of the present disclosure.

Further, alternatively, referring to FIG. 3, FIG. 3 is a flow chart of a method for updating a mining model according to another embodiment of the present disclosure, in which the act S12 may include following acts.

In act S31, the at least two slot templates and the second semantic contents corresponding to the at least two slot templates are extracted from the first format corpus.

In act S32, a permutation and combination is performed on the at least two slot templates so as to acquire the plurality of combinations.

In act S33, the plurality of combinations and the third semantic contents corresponding to the plurality of combinations are regarded as the second format corpus.

For example, referring to the above embodiment, the first format corpus is: 帮我查一下【今 天/ time 】【北京 location】【天气】【怎么样】好不好. The plurality of slot templates and the second semantic contents corresponding to the plurality of slot templates are extracted from the first format corpus so as to acquire: 【今天 time】【北京 location】【天气】【怎么样】, and four corresponding slot templates are: 【time】【location】【weather_slot_0】【weather_slot_1】. After that, a permutation and combination is performed on the at least two slot templates so as to acquire the plurality of combinations.

In the embodiments of the present disclosure, different combinations may be generated according to different orders of the slot templates. In other words, a first combination of the slot templates is: 【time】,【location】; a second combination of the slot templates is: 【location】,【time】; a third combination of the slot templates is: 【time】,【location】, 【weather_slot_0】; a fourth combination of the slot templates is: 【location】,【time】【weather_slot_0】 and so on.

Further, in the embodiments of the present disclosure, after the plurality of combinations may be generated, the plurality of combinations and the third semantic contents corresponding to the plurality of combinations are regarded as the second format corpus. In other words, the first combination 【time】,【location】, and the third semantic contents "今天", "北京" corresponding to the first combination are regarded as the second format corpus; the second combination 【location】,【time】, and the third semantic contents "北京", "今天" corresponding to the second combination are regarded as the second format corpus; the third combination 【time】,【location】,【weather_slot_0】, and the third semantic contents "今天", "北京", "天气" corresponding to the third combination are regarded as the second format corpus; and the fourth combination【location】, 【time】,【weather_slot_0】, and the third semantic contents "北京", "今天", "天气" corresponding to the third combination are regarded as the second format corpus, and so on.

In the embodiments of the present disclosure, the permutation and combination may be performed on the at least two slot templates so as to acquire the plurality of combinations, and the plurality of combinations and the third semantic contents corresponding to the plurality of combinations may be regarded as the second format corpus. Since the iterative updating is performed on the mining model according to the plurality of combinations of the at least two slot templates corresponding to the query input by the user and the semantic contents corresponding to the plurality of combinations, semantic resources for iteratively updating may be diversified and the semantic content of the mining model may be enriched by generating the variety of combinations of the plurality of slot templates, and thus the semantic effect of the semantic analysis system may be improve effectively.

In act S13, the iterative updating is performed on the mining model based on the first format corpus and the second format corpus.

In the embodiments of the present disclosure, after the first format corpus and the second format corpus corresponding to the query input by the user are acquired, the first format corpus and the second format corpus may be added to the mining model so as to iteratively update the mining model.

Further, in the embodiments of the present disclosure, the first format corpus and the second format corpus may be screened, and the iterative updating is performed on the mining model based on the screened corpus.

For example, it is assumed that the query input by the user is: "我想看今天的 天气好不好(I would like to watch whether the weather today is good or not)", the second format corpus corresponding to the query is determined as: 【看(watch)】【time】, and the semantic analysis result corresponding to the query and analyzed by the semantic analysis system is: {field: movie; intention: watch; slot: {time: today}}. The second format corpus【看】【time】 is not in conformity with a real sememe of the query with respect to the semantic analysis result {field: movie intention: watch; slot: {time: today}}. Thus, the second format corpus 【看】【time】may be screened out.

In the embodiments of the present disclosure, the first format corpus and the second format corpus may be screened, and the iterative updating is performed on the mining model based on the screened corpus. After that, the mining may be performed on the semantic resources corresponding to the query input by the user based on the updated mining model, and the semantic resources may be added to the semantic analysis system. Thus, the semantic analysis effect of the semantic analysis system may be improved effectively.

Further, the semantic analysis effect of the semantic analysis system may be ensured and the processing efficiency of the method may be improved.

In this embodiment, the semantic analysis result that is obtained by analyzing the query input by the user through the semantic analysis system may be acquired. The corresponding training format corpus may be generated according to the semantic analysis result, in which the training format corpus includes the first format corpus configured to label the semantic feature in the query and the second format corpus configured to label the template feature in the query. The iterative updating is performed on the mining model based on the first format corpus and the second format corpus. Since the iterative updating is performed on the mining model according to the semantic analysis result acquired by analyzing the query input by the user, abundant semantic resources may be acquired subsequently based on an updated mining model in the semantic analysis system. Therefore, a semantic analysis effect of the semantic analysis system may be improved effectively.

Figure 4:
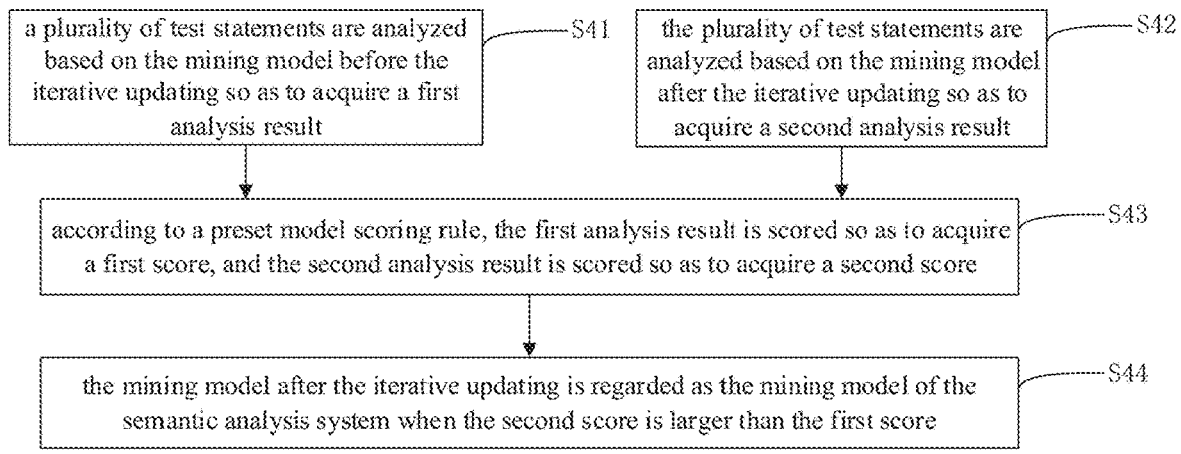
FIG. 4 is a flow chart of a method for updating a mining model according to another embodiment of the present disclosure.

FIG. 4 is a flow chart of a method for updating a mining model according to another embodiment of the present disclosure.

Referring to FIG. 4, the method for updating the mining model may also include following acts after the act S13.

In act S41, a plurality of test statements are analyzed based on the mining model before the iterative updating so as to acquire a first analysis result.

In act S42, the plurality of test statements are analyzed based on the mining model after the iterative updating so as to acquire a second analysis result.

In act S43, according to a preset model scoring rule, the first analysis result is scored so as to acquire a first score, and the second analysis result is scored so as to acquire a second score.

In act S44, the mining model after the iterative updating is regarded as the mining model of the semantic analysis system when the second score is larger than the first score.

In the embodiments of the present disclosure, the semantic analysis results of the mining model before and after the iterative updating may be scored based on the preset model scoring rule, and when the second score is larger than the first score, i.e., when the semantic analysis result of the mining model after the iterative updating is better than that before the iterative updating, the mining model after the iterative updating is regarded as the mining model of the semantic analysis system. When the semantic analysis result of the mining model after the iterative updating is worse than that before the iterative updating, no further processing is performed. Thus, after the iterative updating is performed on the mining model, it may be assured that the semantic analysis effect of the semantic analysis system may be improved in the semantic analysis system with abundant semantic resources acquired based on an updated mining model, so as to ensure an executing efficiency of the method and improve an experience of the user.

Figure 5:
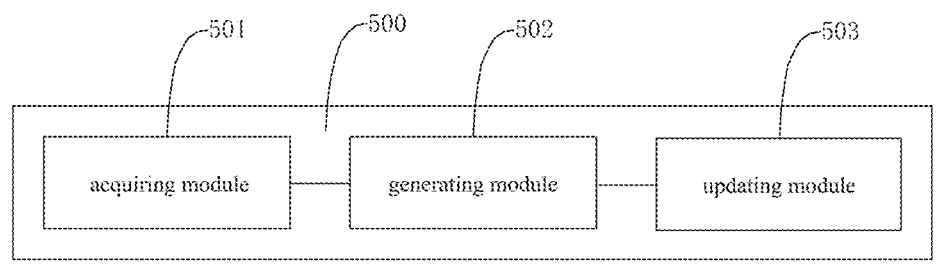
FIG. 5 is a block diagram of an apparatus for updating a mining model according to an embodiment of the present disclosure.

FIG. 5 is a block diagram of an apparatus for updating a mining model according to an embodiment of the present disclosure.

Referring to FIG. 5, the apparatus 500 may include: an acquiring module 501, a generating module 502, and an updating module 503.

The acquiring module 501 is configured to acquire a semantic analysis result obtained by analyzing a query through the semantic analysis system.

The generating module 502 is configured to generate a training format corpus according to the semantic analysis result, in which the training format corpus includes a first format corpus and a second format corpus.

Alternatively, the first format corpus may include: first semantic contents corresponding to a field tag and an intention tag in the query respectively, a plurality of slot templates, and second semantic contents corresponding to the plurality of slot templates respectively.

Alternatively, the second format corpus may include: a plurality of combinations of at least two slot templates, and third semantic contents corresponding to the plurality of combinations respectively.

Figure 6:
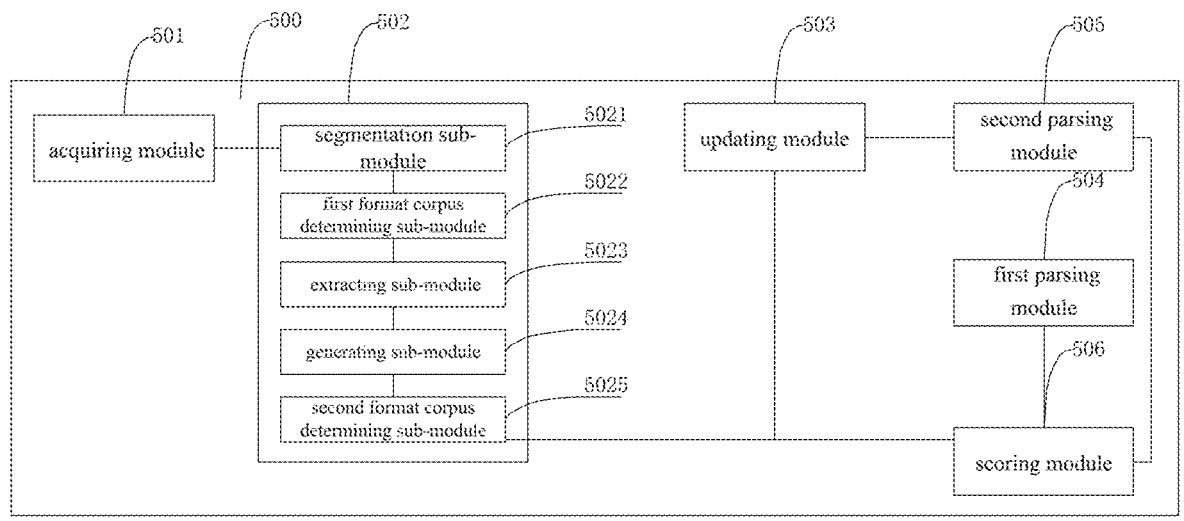
FIG. 6 is a block diagram of an apparatus for updating a mining model according to another embodiment of the present disclosure.

Alternatively, in some embodiments, referring to FIG. 6, the generating module 502 includes: a segmentation sub-module 5021, a first format corpus determining sub-module 5022, an extracting sub-module 5023, a generating sub-module 5024 and a second format corpus determining sub-module 5025. The segmentation sub-module 5021 is configured to perform a segmentation on the query according to the semantic analysis result so as to acquire a plurality of segments. The first format corpus determining sub-module 5022 is configured to regard the plurality of segments as the first format corpus in the training format corpus. The extracting sub-module 5023 is configured to extract the at least two slot templates and the second semantic contents corresponding to the at least two slot templates from the first format corpus. The generating sub-module 5024 is configured to perform a permutation and combination on the at least two slot templates so as to acquire the plurality of combinations. The second format corpus determining sub-module 5025 is configured to regard the plurality of combinations and the third semantic contents corresponding to the plurality of combinations as the second format corpus.

The updating module 503 is configured to perform an iterative updating on the mining model based on the first format corpus and the second format corpus.

The first format corpus is configured to label a semantic feature in the query, and the second format corpus is configured to label a template feature in the query.

Alternatively, in some embodiments, referring to FIG. 6, the apparatus 500 further includes: a first analysis module 504, a second analysis module 505, and a scoring module 506. The first analysis module 504 is configured to analyze a plurality of test statements based on the mining model before the iterative updating so as to acquire a first analysis result. The second analysis module 505 is configured to analyze the plurality of test statements based on the mining model after the iterative updating so as to acquire a second analysis result. The scoring module 506 is configured to, according to a preset model scoring rule, score the first analysis result so as to acquire a first score, and score the second analysis result so as to acquire a second score. The updating module 503 is further configured to regard the mining model after the iterative updating as the mining model of the semantic analysis system when the second score is larger than the first score.

It should be noted that the above description of the method embodiments of FIG. 1-4 is also suitable for the embodiments of the apparatus 500, the realizing principles are similar, and it will not be described in detail herein.

In the embodiments, the semantic analysis result that is obtained by analyzing the query input by the user through the semantic analysis system may be acquired. The training format corpus may be generated according to the semantic analysis result, in which the training format corpus includes the first format corpus configured to label the semantic feature in the query and the second format corpus configured to label the template feature in the query. The iterative updating is performed on the mining model based on the first format corpus and the second format corpus. Since the iterative updating is performed on the mining model according to the semantic analysis result acquired by analyzing the query input by the user, abundant semantic resources may be acquired subsequently based on an updated mining model in the semantic analysis system. Therefore, a semantic analysis effect of the semantic analysis system may be improved effectively.

Embodiments of the present disclosure provide a device for updating a mining model. The device includes: a processor, a memory for storing programs executable by the processor, in which the processor is configured to any embodiment of the above methods.

Embodiments of the present disclosure provide a non-transitory computer-readable storage medium, and when instructions stored in the non-transitory computer-readable storage medium are executed by a processor of an apparatus, the apparatus may be configured to execute any embodiment of the above methods.

It should be noted that that terms such as "first" and "second" are used in the description of the present disclosure for purposes of description and are not intended to indicate or imply relative importance or significance. Moreover, in the description of the present disclosure, "a plurality of" means two or more than two, unless specified otherwise.

It will be understood that, the flow chart or any process or method described herein in other manners may represent a module, segment, or portion of code that comprises one or more executable instructions to implement the specified logic function(s) or that comprises one or more executable instructions of the steps of the progress. And the scope of a preferred embodiment of the present disclosure includes other implementations in which the order of execution may differ from that which is depicted in the flow chart, which should be understood by those skilled in the art.

It should be understood that the various parts of the present disclosure may be realized by hardware, software, firmware or combinations thereof. In the above embodiments, a plurality of steps or methods may be stored in a memory and achieved by software or firmware executed by a suitable instruction executing system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable memory medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable memory medium.

The above-mentioned memory medium may be a read-only memory, a magnetic disc, an optical disc, etc.

In the description of the present disclosure, reference term "an embodiment," "some embodiments," "an example," "a specific example," or "some examples," means that a particular feature, structure, material, or characteristic described in connection with the embodiment or example is included in at least one embodiment or example of the present disclosure. Furthermore, the particular features, structures, materials, or characteristics may be combined in any suitable manner in one or more embodiments or examples.

Although explanatory embodiments have been shown and described, it would be appreciated that the above embodiments are explanatory and cannot be construed to limit the present disclosure, and changes, alternatives, and modifications can be made in the embodiments without departing from scope of the present disclosure by those skilled in the art.

What is claimed is:

1. A method for updating a mining model, wherein the method is applied to the mining model in a semantic analysis system and comprises:

acquiring a semantic analysis result obtained by analyzing a query through the semantic analysis system;

generating a training format corpus according to the semantic analysis result, wherein the training format corpus comprises a first format corpus and a second format corpus;

performing an iterative updating on the mining model based on the first format corpus and the second format corpus, wherein the first format corpus is configured to label a semantic feature in the query, and the second format corpus is configured to label a template feature in the query;

analyzing a plurality of test statements based on the mining model before the iterative updating so as to acquire a first analysis result;

analyzing the plurality of test statements based on the mining model after the iterative updating so as to acquire a second analysis result;

according to a preset model scoring rule, scoring the first analysis result so as to acquire a first score, and scoring the second analysis result so as to acquire a second score; and regarding the mining model after the iterative updating as the mining model of the semantic analysis system when the second score is larger than the first score.

2. The method according to claim 1, wherein the first format corpus comprises:

first semantic contents corresponding to a field tag and an intention tag in the query respectively, a plurality of slot templates, and second semantic contents corresponding to the plurality of slot templates respectively.

3. The method according to claim 2, wherein generating a training format corpus according to the semantic analysis result comprises:

performing a segmentation on the query according to the semantic analysis result so as to acquire a plurality of segments;

regarding the plurality of segments as the first format corpus in the training format corpus.

4. The method according to claim 2, wherein the second format corpus comprises:

a plurality of combinations of at least two slot templates, and third semantic contents corresponding to the plurality of combinations respectively.

5. The method according to claim 4, wherein generating a training format corpus according to the semantic analysis result comprises:

extracting the at least two slot templates and the second semantic contents corresponding to the at least two slot templates from the first format corpus;

performing a permutation and combination on the at least two slot templates so as to acquire the plurality of combinations; and regarding the plurality of combinations and the third semantic contents corresponding to the plurality of combinations as the second format corpus.

6. The method according to claim 1, wherein after the training format corpus is generated according to the semantic analysis result, the method further comprises:

screening the training format corpus.

7. An apparatus for updating a mining model, wherein the apparatus is applied to the mining model in a semantic analysis system and comprises:

a processor;

a memory for storing programs executable by the processor, wherein the processor is configured to:

acquire a semantic analysis result obtained by analyzing a query through the semantic analysis system;

generate a training format corpus according to the semantic analysis result, wherein the training format corpus comprises a first format corpus and a second format corpus;

perform an iterative updating on the mining model based on the first format corpus and the second format corpus, wherein the first format corpus is configured to label a semantic feature in the query, and the second format corpus is configured to label a template feature in the query;

analyze a plurality of test statements based on the mining model before the iterative updating so as to acquire a first analysis result;

analyze the plurality of test statements based on the mining model after the iterative updating so as to acquire a second analysis result;

according to a preset model scoring rule, score the first analysis result so as to acquire a first score, and score the second analysis result so as to acquire a second score; and regard the mining model after the iterative updating as the mining model of the semantic analysis system when the second score is larger than the first score.

8. The apparatus according to claim 7, wherein the first format corpus comprises:

first semantic contents corresponding to a field tag and an intention tag in the query respectively, a plurality of slot templates, and second semantic contents corresponding to the plurality of slot templates respectively.

9. The apparatus according to claim 8, wherein the processor is configured to, generate a training format corpus according to the semantic analysis result, by acts of:

performing a segmentation on the query according to the semantic analysis result so as to acquire a plurality of segments;

regarding the plurality of segments as the first format corpus in the training format corpus.

10. The apparatus according to claim 8, wherein the second format corpus comprises:

a plurality of combinations of at least two slot templates, and third semantic contents corresponding to the plurality of combinations respectively.

11. The apparatus according to claim 10, wherein the processor is configured to, generate a training format corpus according to the semantic analysis result, by acts of:

extracting the at least two slot templates and the second semantic contents corresponding to the at least two slot templates from the first format corpus;

performing a permutation and combination on the at least two slot templates so as to acquire the plurality of combinations; and regarding the plurality of combinations and the third semantic contents corresponding to the plurality of combinations as the second format corpus.

12. The apparatus according to claim 7, wherein the processor is further configured to:

screen the training format corpus.

13. A non-transitory computer-readable storage medium having stored therein instructions that, when executed by a processor of an apparatus, causes the apparatus to perform method for updating a mining model, the method comprising:

acquiring a semantic analysis result obtained by analyzing a query through the semantic analysis system;

generating a training format corpus according to the semantic analysis result, wherein the training format corpus comprises a first format corpus and a second format corpus;

performing an iterative updating on the mining model based on the first format corpus and the second format corpus, wherein the first format corpus is configured to label a semantic feature in the query, and the second format corpus is configured to label a template feature in the query;

analyzing a plurality of test statements based on the mining model before the iterative updating so as to acquire a first analysis result;

analyzing the plurality of test statements based on the mining model after the iterative updating so as to acquire a second analysis result;

according to a preset model scoring rule, scoring the first analysis result so as to acquire a first score, and scoring the second analysis result so as to acquire a second score; and regarding the mining model after the iterative updating as the mining model of the semantic analysis system when the second score is larger than the first score.

14. The non-transitory computer-readable storage medium according to claim 13, wherein the first format corpus comprises:

first semantic contents corresponding to a field tag and an intention tag in the query respectively, a plurality of slot templates, and second semantic contents corresponding to the plurality of slot templates respectively.

15. The non-transitory computer-readable storage medium according to claim 14, wherein generating a training format corpus according to the semantic analysis result comprises:

performing a segmentation on the query according to the semantic analysis result so as to acquire a plurality of segments;

regarding the plurality of segments as the first format corpus in the training format corpus.

16. The non-transitory computer-readable storage medium according to claim 14, wherein the second format corpus comprises:

a plurality of combinations of at least two slot templates, and third semantic contents corresponding to the plurality of combinations respectively.

17. The non-transitory computer-readable storage medium according to claim 16, wherein generating a training format corpus according to the semantic analysis result comprises:

extracting the at least two slot templates and the second semantic contents corresponding to the at least two slot templates from the first format corpus;

performing a permutation and combination on the at least two slot templates so as to acquire the plurality of combinations; and regarding the plurality of combinations and the third semantic contents corresponding to the plurality of combinations as the second format corpus.

* * * * *